United States Patent Office 3,260,719
Patented July 12, 1966

3,260,719
ORGANO-PHOSPHORUS s-TRIAZINE DERIVATIVES
Arthur John Floyd, Bracknell, England, assignor to Imperial Chemical Industries Limited, London, England, a corporation of Great Britain
No Drawing. Filed Jan. 17, 1964, Ser. No. 338,321
11 Claims. (Cl. 260—249.9)

This invention relates to organo-phosphorus s-triazine compounds, to processes for their preparation and to their use as pesticides.

The invention consists in one aspect of s-triazine derivatives of the formula:

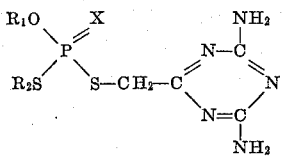

wherein $R_1$ and $R_2$, which may be the same or different, are alkyl radicals of 1–4 carbon atoms, for instance methyl or ethyl radicals; and X is an atom of oxygen or sulphur, and salts thereof.

The s-triazine compounds of the invention may be obtained by a process in which a compound of the formula:

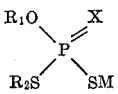

where $R_1$, $R_2$ and X have the meanings given to them above and M stands for sodium or a like alkali metal, or an ammonium radical, is brought into reaction with a compound of the formula:

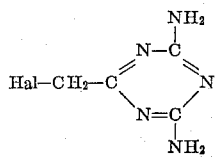

wherein Hal is an atom of halogen, preferably a chlorine atom.

An alternative method by which these compounds may be made comprises treating an O-alkyl-4,6-diamino-s-triazin-2-ylmethyl phosphorothioic acid with an alkylating agent. Suitable alkylating agents comprise alkyl halides and p-toluenesulphonates. An especially suitable thioic acid is O-methyl-4,6-diamino-s-triazin-2 - ylmethyl phosphorodithioic acid hereinafter referred to as desmethyl menazon.

The invention also comprises pesticidal compositions comprising as active ingredient an organo phosphorus compound of this invention and an inert diluent which may be a solid or a liquid. The pesticidal compositions can, for example, be liquid compositions in which the active ingredient is dissolved or dispersed in water or a non-phytotoxic organic liquid. Aqueous dispersions of a compound of the invention may be obtained by dissolving the compound in a small quantity of an organic liquid which is immiscible with water and then dispersing the resulting solution in water, preferably with the aid of a dispersing agent.

The pesticidal compositions may be in the form of powders in which the active ingredient is in admixture with a powder diluent. The pesticidal compositions, whether liquid or powder, may contain a wetting or dispersing agent to facilitate their use as spray compositions, or may contain a wetting or dispersing agent to facilitate their use as spray compositions, or may contain other substances useful in the formulation of pesticidal compositions, for example binders, stickers, corrosion inhibitors or stabilising agents.

Solid compositions for use as dusting powders may contain as a diluent koalin, Fuller's earth, gypsum, chalk and Hewitt's earth. If powders are required for dispersion in a liquid the following diluents give especially good results, koalin, Fuller's earth, light magnesium carbonate inorganic and water soluble fillers for example sodium sulphate, sodium chloride and sodium bicarbonate. In the preparation of liquid compositions certain aromatic and aliphatic liquids, e.g. trimethyl benzene, xylene, solvent naphtha and methyl naphthalene are suitable, whilst aliphatic liquids, including mineral oil and kerosene also may be used. Suitable wetting agent and emulsifiers include calcium and sodium various condensation products of ethylene oxide with octyl phenol, nonyl phenol, sorbitan monolaurate, oleyl alcohol and cetyl alcohol. Additional advantage may also be obtained by using certain dispersing agents, e.g. glue and the calcium or sodium or ammonium salts of lignosulphonic acid.

The compositions which are for use as a liquid are generally supplied to the user in the form of concentrated compositions containing a high proportion of active compounds, e.g. from 10–80% by weight. The concentrated composition may be in the form of dispersible powders, creams, pastes or even liquids. These may then be diluted with water to form liquid compositions containing generally from 0.01–0.5% by weight of the compound and are then ready for application.

The compounds and compositions formed from them are especially useful for the destruction of aphids, red spider and Dysdercus infesting a variety of crop producing plants which include potatoes, sugarbeet, broadbeans, garden vegetables, tobacco, cotton, apples and plums. As a result of the treatment of these crop producing plants, the pests are killed and the weights of crops obtainable are greater than the weights obtained from untreated infested plants. Accordingly this invention includes the treatment of crop producing plants infested with pests and subsequently harvesting the crops forming part of the treated plants. This invention is illustrated by the following examples.

*Example 1*

This example describes the preparation of O-methyl S-methyl S-4,6-diamino s-triazin-2 - ylmethyl phosphorodithioate.

Desmethyl menazon (8.01 g.) was dissolved in a solution of sodium methoxide (from 0.69 g. of sodium) in methanol (60 ml). The resultant solution was cooled in an ice-bath and to it was added as drops methyl iodide (4.5 g.), and the mixture was heated under reflux for 2 hours. On cooling an oil separated, which crystallised on standing overnight. The crystalline solid was collected, slurried with water, recollected, and dried, to yield O-methyl S-methyl S-4,6-diamino-s-triazin-2-ylmethyl phosphorodithioate, whose melting point after recrystallisation from a large volume of 95% aqueous methanol was found to be 180° C. (decomp.). This product has been found to have pesticidal properties, being active against aphids, red spider and Dysdercus.

The desmethyl menazon used as starting material in this example was obtained from O,O-dimethyl S-4,6-diamino-s-triazin-2-yl-phosphorodithioate (otherwise known by the common name "menazon") as follows. Menazon (112 g.) was heated to 85–90° C. with O,O-dimethyl phosphorodithioate (80.6 g.), sodium hydroxide (20 g.) and water (1500 ml.) for 4½ hours. After cooling to room temperature the liquid product was filtered to remove the grey solid present in the product, the filtrate was extracted with chloroform and the resulting aqueous layer acidified with glacial acetic acid to pH 3–4. The acidified aqueous liquor was maintained at 0° C. for 2 days, and the solid which had then separated was collected, washed with a little cold water and dried in a vacuum dessicator to yield 67 g. of desmethyl menazon, N.P. 195–204° C. (decomp.).

*Example 2*

This example describes an alternative way of making O-methyl S-4,6-diamino s-triazin-2-ylmethyl phosphorodithioate. Desmethyl menazon (8.01 g.) was dissolved in a solution of sodium methoxide obtained by reacting 0.69 g. of sodium metal with 60 ml. of methanol. The solution of the menazon and the sodium salt was then treated with methyl p-toluenesulphonate (5.75 g.) care being taken to maintain the temperature of the reaction mixture below 7° C. The mixture was then heated under reflux for 2 hours and then allowed to cool. On cooling crystals (4.0 g.) separated. These were then separated, washed with water and dried. They were then recrystallised from ethanol containing a little water. The resulting product consisting of O-methyl S-methyl S-4,6-diamino-s-triazin-2-yl phosphorodithioate comprised colourless needles which melted with decomposition at 180° C.

*Example 3*

This example describes the preparation of O-methyl S-ethyl 4,6 - diamino - s - triazin - 2 - ylmethyl phosphorodithioate. Desmethyl menazon (8.01 g.) was dissolved in a solution of sodium methoxide obtained by dissolving 0.69 g. of sodium metal in 60 ml. of methanol. The resulting solution of the menazon and the sodium salt was cooled below 7° C. while ethyl-p-toluenesulphonate (6.0 g.) was added. The mixture was then heated under a reflux for two hours, after which the methanol was removed by distillation under reduced pressure. The resulting product was then slurried with water (100 ml.) filtered and dried. 1.7 g. of white crystals melting at a 150–151° C. and comprising substantially of O-methyl S-ethyl 4,6-diamino-s-triazin-2-ylmethyl phosphorodithioate were obtained.

*Example 4*

This example describes the preparation of O-methyl S-propyl 4,6-diamino-s-triazin-2-ylmethyl phosphorodithioate. The method used was similar to that described in Example 3 with a difference that propyl-p-toluenesulphonate (9.5 g.) was used as the alkylating agent. 3.2 g. of a product comprising essentially of O-methyl S-propyl 4,6-diamino-s-triazin-2-ylmethyl phosphorodithioate were obtained.

*Example 5*

The following example illustrates the activity of the compounds described in the preceding examples against various pests.

The compositions used in the test comprised dispersions containing respectively 0.05 and 0.01% by weight of the compound dispersed in water containing 4% by weight of a mixture in equal proportions of ethyl alcohol and acetone and 0.01% by weight of a wetting agent sold under the trade name Lissapol NX (Lissapol is a registered trademark).

The compounds in the above concentrations were all found effective against some of the following pests which are listed below with the medium or host plants which supported them.

| Pest: | Heat plant/medium |
|---|---|
| Aphis fabae | Broad bean plants. |
| Macrosiphum pisi | do |
| Tetranychus (red spider mite) | do |
| Dysdercus | Cotton seedlings. |
| Plutella | Cabbage plants. |
| Calandra | Wheat grains. |
| Phaedon | Mustard plants. |
| Musca | Cotton wool soaked with sugar and milk. |

The compound of Example 5 showed a generally greater range of activity and all the compounds were effective against mosquitoes at 0.01%.

What I claim is:

1. An O-allyl-S-alkyl 4,6-diamino-s-triazin-2-ylmethyl phosphorothioate wherein the alkyl contains from 1–4 carbon atoms.

2. A compound as claimed in claim 1 wherein the phosphorothioate is a phosphorodithioate.

3. A compound as claimed in claim 1 having the formula

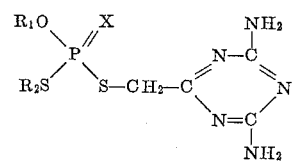

wherein $R_1$ and $R_2$ are alkyl containing 1–4 carbon atoms and X is an atom selected from the group consisting of sulphur and oxygen.

4. A compound as claimed in claim 3 wherein $R_1$ and $R_2$ are straight chain alkyl containing from 1–3 carbon atoms and X is an atom of sulphur.

5. A compound as claimed in claim 3 wherein $R_1$ and $R_2$ are different alkyls each of which contains from 1–4 carbon atoms.

6. O-methyl S-methyl S-4,6-diamino s-triazin-2-ylmethyl phosphorodithioate.

7. O - methyl S - ethyl 4,6 - diamino - s - triazin - 2-ylmethyl phosphorodithioate.

8. O - methyl S - propyl 4,6 - diamino - s - triazin - 2-ylmethyl phosphorodithioate.

9. A process of making an O-alkyl-S-alkyl 4,6-diamino-s-triazin-2-ylmethyl phosphorothioate wherein the alkyl contains from 1–4 carbon atoms which comprises reacting an O -alkyl s - 4,6 - diamino - s - triazin - 2 - ylmethyl phosphorothioic acid with an alkylating agent.

10. A process as claimed in claim 9 wherein the alkylating agent is an alkyl halide.

11. A process as claimed in claim 9 wherein the alkylating agent is an alkyl p-toluenesulphonate.

References Cited by the Examiner

UNITED STATES PATENTS

| | | | |
|---|---|---|---|
| 2,685,581 | 8/1954 | Coover | 260—248 |
| 2,706,194 | 4/1955 | Morris et al. | 260—249.8 |
| 2,822,364 | 2/1958 | Schuller | 260—249.9 |
| 2,848,452 | 8/1958 | Schuller | 260—249.9 |
| 2,881,201 | 4/1959 | Schrader | 260—461 |
| 2,887,432 | 5/1959 | Baker et al. | 167—33 |
| 2,976,207 | 3/1961 | Little et al. | 167—33 |
| 3,169,964 | 2/1965 | Calderbank | 260—249.9 |

FOREIGN PATENTS

| | | |
|---|---|---|
| 231,965 | 1/1961 | Australia. |
| 1,219,238 | 5/1960 | France. |

WALTER A. MODANCE, *Primary Examiner.*

NICHOLAS, S. RIZZO, JOHN D. RANDOLPH, *Examiners.*

M. W. WESTERN, JOHN M. FORD, *Assistant Examiners.*